United States Patent [19]
Udagawa et al.

[11] Patent Number: 5,303,068
[45] Date of Patent: Apr. 12, 1994

[54] IMAGE DATA PROCESSING APPARATUS FOR DIFFERENCE SCANNING METHODS

[75] Inventors: Yutaka Udagawa, Machida; Toshihiko Ohtsubo, Yokohama, both of Japan

[73] Assignee: Canon Kabushiki Kaisha, Tokyo, Japan

[21] Appl. No.: 73,979

[22] Filed: Jun. 8, 1993

Related U.S. Application Data

[63] Continuation of Ser. No. 625,047, Dec. 10, 1990.

[30] Foreign Application Priority Data

Dec. 11, 1989 [JP] Japan .................................. 1-322312

[51] Int. Cl.⁵ ............................................. H04N 1/40
[52] U.S. Cl. ..................................... 358/444; 358/448
[58] Field of Search ............... 358/434, 438, 444, 474, 358/445, 453, 462, 404, 451, 140, 494, 497, 310, 312, 335, 448; 360/27, 35.1, 33.1

[56] References Cited

U.S. PATENT DOCUMENTS

4,442,460  4/1984  Kurata et al. .................. 358/296
4,942,479  7/1990  Kanno ............................ 358/448

Primary Examiner—Edward L. Coles, Sr.
Assistant Examiner—Jill Jackson
Attorney, Agent, or Firm—Fitzpatrick, Cella, Harper & Scinto

[57] ABSTRACT

A memory addressing method by which it is possible to write into, or read out from, a memory a plurality of kinds of image data whose pixel data are transmitted in any of two or more different orders (sequences). In this method, a parameter can be preset in correspondence to the kind of the image data, an address value is calculated for every pixel datum on the basis of the set parameter, and each of the pixel data is written or read out by using the calculated address value.

25 Claims, 6 Drawing Sheets

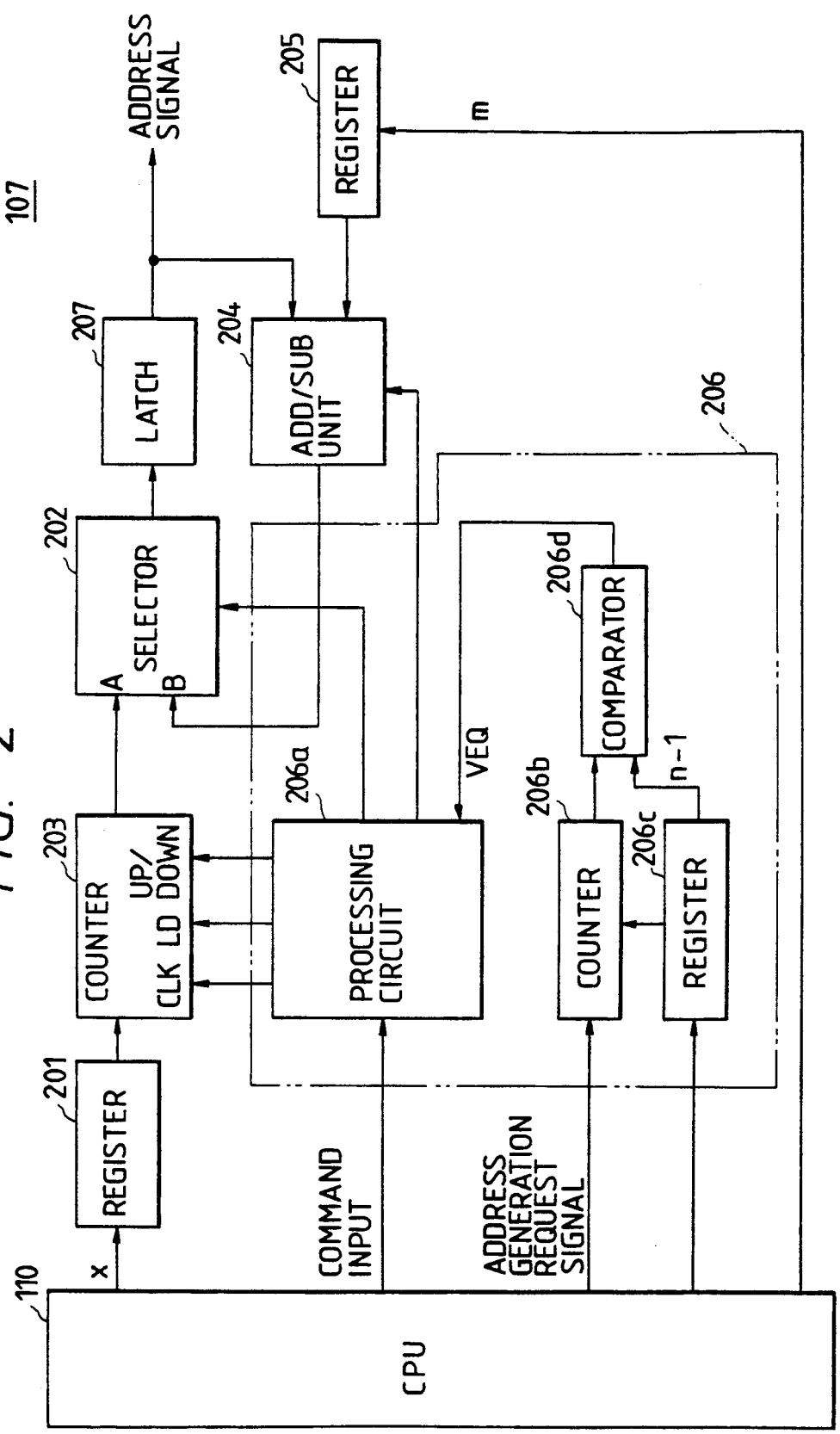

(1)  (2)  (3)

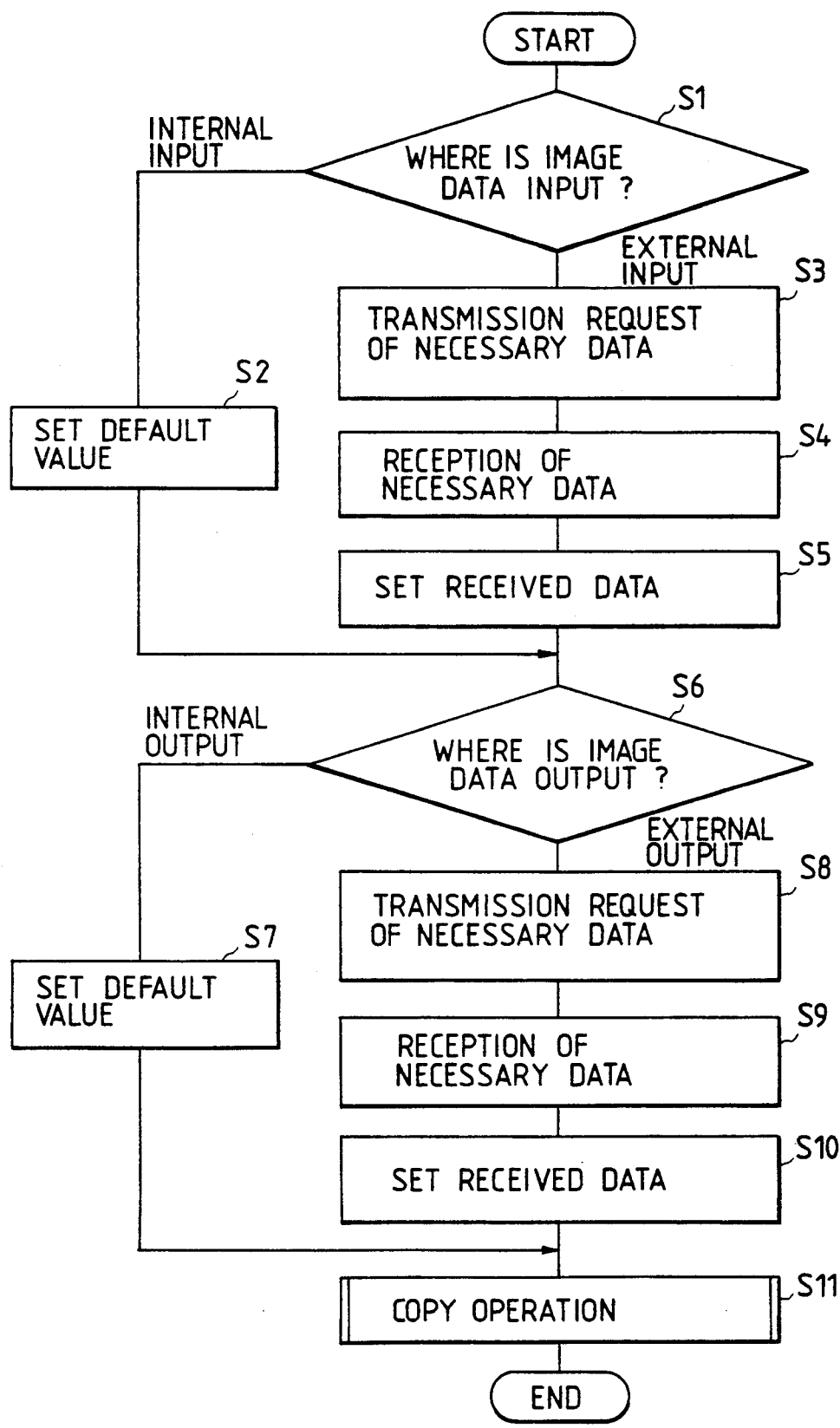

IMAGE DATA PROCESSING APPARATUS FOR DIFFERENCE SCANNING METHODS

This application is a continuation of application Ser. No. 07/625,047, filed Dec. 10, 1990, allowed Mar. 10, 1993.

BACKGROUND OF THE INVENTION

1. Field of the Invention

The present invention relates to a memory addressing method in an image data processing apparatus such as a digital copying apparatus or the like and to an apparatus using such a method and, more particularly, to a memory accessing method for efficiently processing image data to be input and output in accordance with a plurality of kinds of arrangement orders in correspondence to each kind and to an apparatus using such a method.

2. Related Background Art

Hitherto, digital copying apparatuses using various kinds of printing and reading methods have been put into practical use. An image reading unit of the digital copying apparatus or the like outputs pixel data in accordance with the order corresponding to the reading method. Arranging methods of the pixel data which is output from the image reading unit are mainly classified into the following two kinds.

① FIG. 3A is a diagram showing a serial scan when reading an original. Reference characters $A_1$ to $A_4$ denote area widths which are read by an image sensor 101 by a single scan. The image sensor 101 moves from the left side to the right side (H direction) in the diagram, so that a block of $A_1$ can be read. Then, the image sensor or the original is moved in the direction of V by only a width (width of area which is read by the image sensor) of $A_1$ and a block of $A_2$ is read while again moving the image sensor from the left edge in the diagram in the H direction. By sequentially repeating the above operations, an image 301 of the original is read. In the case of reading the image 301 by using the image sensor 101, the whole image 301 is read by serially scanning the areas indicated by reference characters $A_1$ to $A_k$ ($k=4$ in the diagram) in the direction indicated by an arrow H in accordance with the order. The pixel data is output in accordance with the reading order. The image data comprising the pixel data which is sent in accordance with such an order is hereinafter, referred to as a "shuttle scan data".

② FIG. 3B is a diagram for explaining the reading operation of an image scanner 401 having a width $B_1$. In the image reading apparatus, the image 301 is read by scanning the image scanner 401 once in the direction of an arrow V. Therefore, the image reading apparatus sequentially outputs the pixel data in accordance with the raster scanning order. The image data comprising the pixel data which is sent in accordance with such an order is hereinlater referred to as a "raster scan data".

On the other hand, the order has been also predetermined in accordance with the printing method with the pixel data to be input to a printer unit of a digital copying apparatus or the like. Raster scan data is generally input to the printer unit of, for example, the electrophotographic method. Shuttle scan data is generally input to the printer unit of the method such as a serial dot method, an ink jet method, or the like for executing the printing operation while moving a print head.

On the other hand, the image data from the image reading unit is stored into a memory in order to execute various image processes or to synchronize with the printing operation timing in the printer unit. There is a case where a memory capacity of such a memory is equal to or larger than the capacity of one page of the image data or where it is smaller than one page. In any of the above cases, the pixel data is written into the memory in accordance with the sending order, while the pixel data is output from the memory in accordance with the reading-out order.

Hitherto, an image data processing apparatus of the digital copying apparatus or the like is constructed so as to have only one kind of addressing method when the memory is accessed. That is, in the case where the sending order of the pixel data from the image reading unit is equal to the sending order of the pixel data to be output to the printer unit, the pixel data is written into the memory while sequentially incrementing the address values and is read out of the memory by substantially the same addressing method as that upon writing.

Therefore, even in the case where a printing apparatus of another printing method is connected to the conventional digital copying apparatus and an image which was read by the image reading unit is printed, if the order of the pixel data which is processed by the digital copying apparatus differs from the order of the pixel data to be input to the printing apparatus, such an operation cannot be executed. On the other hand, there is also a similar problem in the case where a reading apparatus of another reading method is connected to the conventional digital copying apparatus and is used.

In recent years, a system in which a computer is connected to a digital copying apparatus and image data which is output from the computer can be printed by the digital copying apparatus has been also put into practical use. However, if the image data which is processed by a digital copying apparatus is the shuttle scan data, since the image data which is output from a computer is ordinarily raster scan data, the computer cannot be connected to the digital copying apparatus. In addition, the digital copying apparatus which handles the shuttle scan data is not suitable for image processes by the CPU and causes a deterioration in processing efficiency.

Such a problem also similarly occurs in a printer, an image scanner, or an image data processing apparatus into/from which image data is input/output as well as the digital copying apparatus. In other words, those apparatuses lack generality because the orders of the pixel data to be input/output cannot be changed.

SUMMARY OF THE INVENTION

It is an object of the present invention to solve the above technical problems.

Another object of the invention is to provide an image data processing apparatus which can process image data irrespective of the orders of pixel data constructing the image data which is input/output.

Still another object of the invention is to provide an image data processing apparatus which can improve a processing efficiency of image data.

According to the invention, when a plurality of kinds of image data in which transmitting orders of pixel data are different are stored into an image memory or are read out of the image memory, an address designating method can be changed in accordance with the order of the pixel data, thereby improving the generality of an apparatus and a processing efficiency of the image data.

The above and other objects and features of the present invention will become apparent from the following detailed description and the appended claims with reference to the accompanying drawings.

BRIEF DESCRIPTION OF THE DRAWINGS

FIG. 2 is a block diagram showing a construction of an address control unit 107 of the copying apparatus shown in FIG. 1;

FIG. 7 is a flowchart showing another embodiment of the invention.

DETAILED DESCRIPTION OF THE PREFERRED EMBODIMENTS

Figure 1:
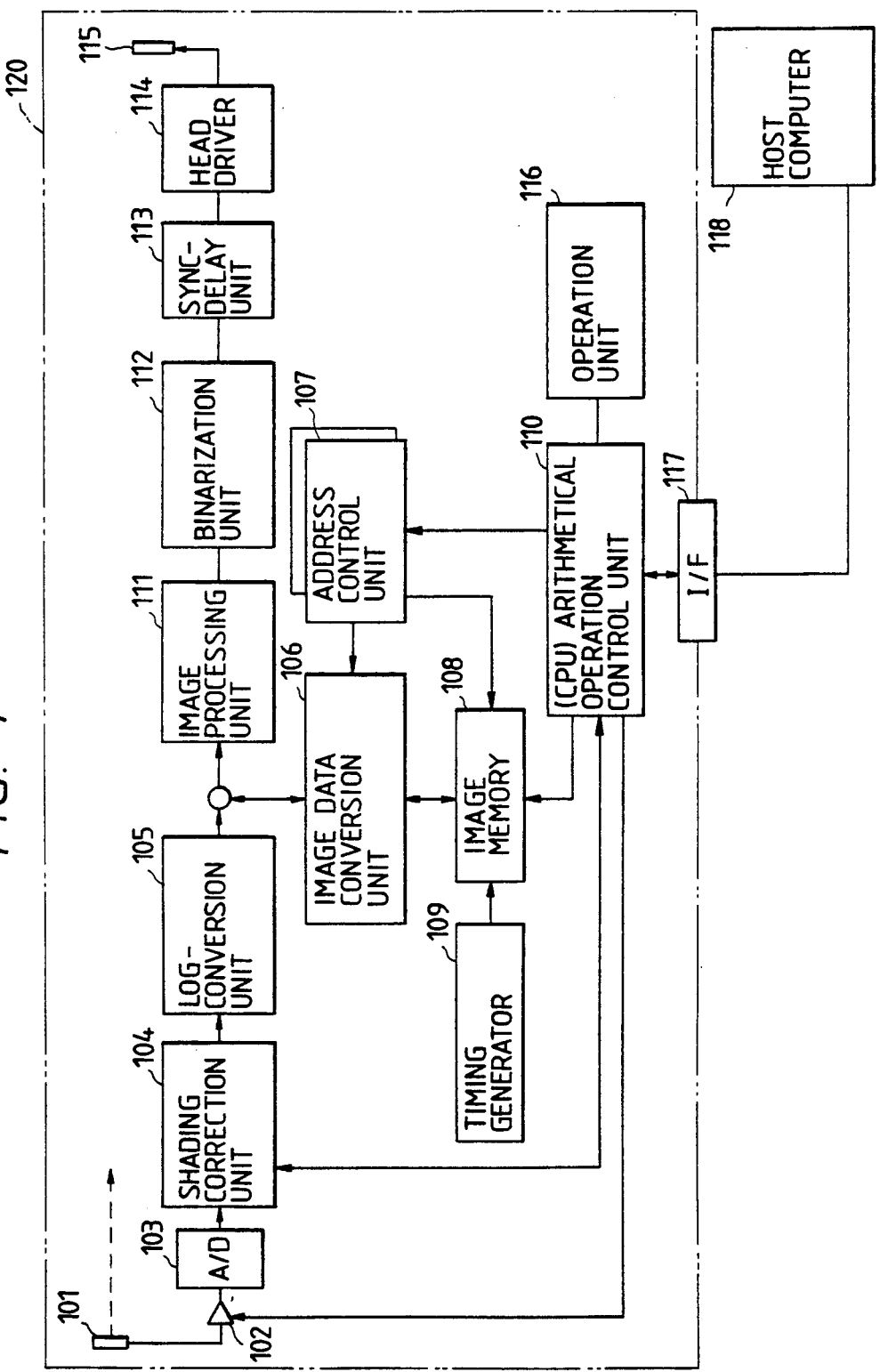
FIG. 1 is a block diagram showing a construction of a copying apparatus of an embodiment of the invention.

FIG. 1 is a block diagram showing a construction of a copying apparatus 130 according to an embodiment of the invention. A method of reading an image and storing image data into a memory will be first described.

An image which was read by the image sensor 101 in a manner which will be explained hereinlater is converted into an electric signal every pixel. The electric signal is amplified to a predetermined value by an amplifying circuit 102 whose gain can be adjusted. After that, the signal is A/D converted into a digital image signal (image data) by an A/D converter 103. The image data includes a shading of a lamp (not shown) for irradiating an original, the image sensor 101, and a lens system (not shown). A shading correction unit 104 corrects such a shading.

The image data which was corrected as mentioned above is converted from the data indicative of a luminance into the data indicative of a density by a log-conversion unit 105 and stored into a memory 108. Since the image sensor 101 of the embodiment reads an original by a reading method shown in FIG. 3A, the image data is transmitted as shuttle scan data. An address control unit 107 controls a write address in the memory as will be explained hereinlater in accordance the size of image to be read and converts the shuttle scan data into the surface data (image data in the case where the raster scan data was stored by sequentially incrementing the addresses) which can be displayed by a CRT which is provided for a host computer 118 or the like and writes into the memory 108. On the other hand, the image data conversion unit 106 is provided to realize various image processing functions.

For instance, an RAM is used as the memory 108. In the case of using a D-RAM, a timing generator 109 refreshes the memory 108 and generates a write signal to the memory 108 in accordance with the address upon writing of data, thereby controlling the writing operation of the image data into the memory.

As mentioned above, the shuttle scan data is converted into the surface data and stored into the memory 108.

The operation which is executed in the case where the image data stored as the surface data in the memory 108 is printed by a print head 115 which receives shuttle scan data will now be described.

The address control unit 107 generates an address signal, which will be explained hereinlater, in order to convert into the shuttle scan data in accordance with the print size. On the other hand, the timing generator 109 generates a read signal, thereby allowing the image data to be read out of the memory 108 as the shuttle scan data.

The image data which was read out as mentioned above is corrected to the coloring appropriate to the print head 115 by an image processing unit 111. In the above image process, in the case of color image data, the color tone can be corrected by a masking process. Further, the density or the like can be corrected by the correction of the color tone.

In the following description, the image data is the binary data and explanation will be made as an example on the assumption that the binary printing operation is performed. However, in the case of the image data of multiple values, the image data is converted into the binary image data by a binarization unit 112. In the case where the print head 115 comprises a plurality of heads (in the case of color data or the like), the print timings among the plurality of heads are corrected by a sync-delay unit 113 and the image data which was output from the image processing unit 111 or the binarization unit 112 is given to a head driver 114 and printed by the print head 115.

The above-described control is executed by a CPU arithmetical operation control unit 110. A control state and the operation in this case can be displayed and key-input by an operation unit 116. Further, the image information of the host computer 118 can be transferred to the memory 108 by a data transfer method such as GPIB, SCSI, or the like. For this purpose, an interface (I/F) unit 117 is provided.

In the embodiment, since the shuttle scan data is stored into the memory 108 as surface data, the image data can be read out of the memory 108 as raster scan data by sequentially incrementing the addresses. Therefore, the raster scan data which was read out as mentioned above can be transmitted to the host computer 118 through the I/F unit 117 and can be subjected to a desired image process or the like by the host computer 118.

In the case of printing the image which was formed by the host computer 118, the host computer 118 can output the raster scan data. The copying apparatus 130 can input the raster scan data from the host computer 118 via the I/F unit 117 in spite of the fact that the image data which is input/output to/from the image scanner 101 and the print head 115 is the shuttle scan data. Such raster scan data is written into the memory 108 while sequentially incrementing the addresses.

FIG. 2 is a block diagram showing a construction of the address control unit 107 for controlling the addressing in the memory 108. Two address control units 107 each having the construction shown in FIG. 2 are independently provided for writing the image data from the scanning apparatus and for reading out the image data from the printing apparatus. The construction shown in FIG. 2 will now be described hereinbelow.

Registers 201 and 205 are provided for the CPU 110 to set predetermined data. An initial value x to be loaded into a counter 203 is set into the register 201. A numerical value to be added or subtracted by an addition/subtraction unit (hereinafter, referred to as an add/sub unit) 204 is set into the register 205. A selector 202 selects either one of a count value of the counter 203 and an output of the add/sub unit 204 and outputs to a latch circuit 207. Reference numeral 206 denotes a control unit for controlling the operation timing of each circuit in FIG. 2. A command input line is connected to the control unit 206 in order to set a command from the CPU 110. An addressing mode is instructed by the command. On the other hand, an address generation request line is also connected to the control unit 206 and is turned on when the image data is read or written from/into the memory 108. Due to this, the control unit 206 outputs an address signal in a preset mode in response to the command from the CPU 110. The address generation request is generated in a real-time manner every pixel synchronously with the operating speed of, for example, the scanner or printer. As mentioned above, since the address control unit 107 independently has the foregoing construction for each of the writing operation (for the scanner) and the reading operation (for the printer), both of the reading and writing operations can be executed in parallel. The case where the image data which was read out from the scanner is written into the image memory will now be described hereinafter.

Figure 3A:
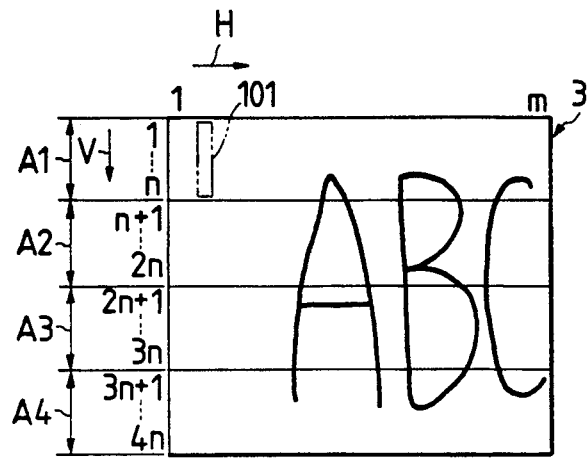
FIGS. 3A and 3B are diagrams for explaining the image reading operation.

In FIG. 3A, in the case of reading the image 301 by the scanner (including the image sensor 101) of the copying apparatus 130 in the embodiment, the whole image 301 is read by serially scanning the areas shown at $A_1$ to $A_k$ (k=4 in the diagram) in accordance with the order in the direction indicated by the arrow H. In the embodiment, the image data which was read as mentioned above can be stored into the memory 108 as surface data of the same raster scanning format as the arrangement of the pixels which are processed by the host computer or the like. The generating operation of the address signal in the above case will now be described hereinbelow.

Figure 4:
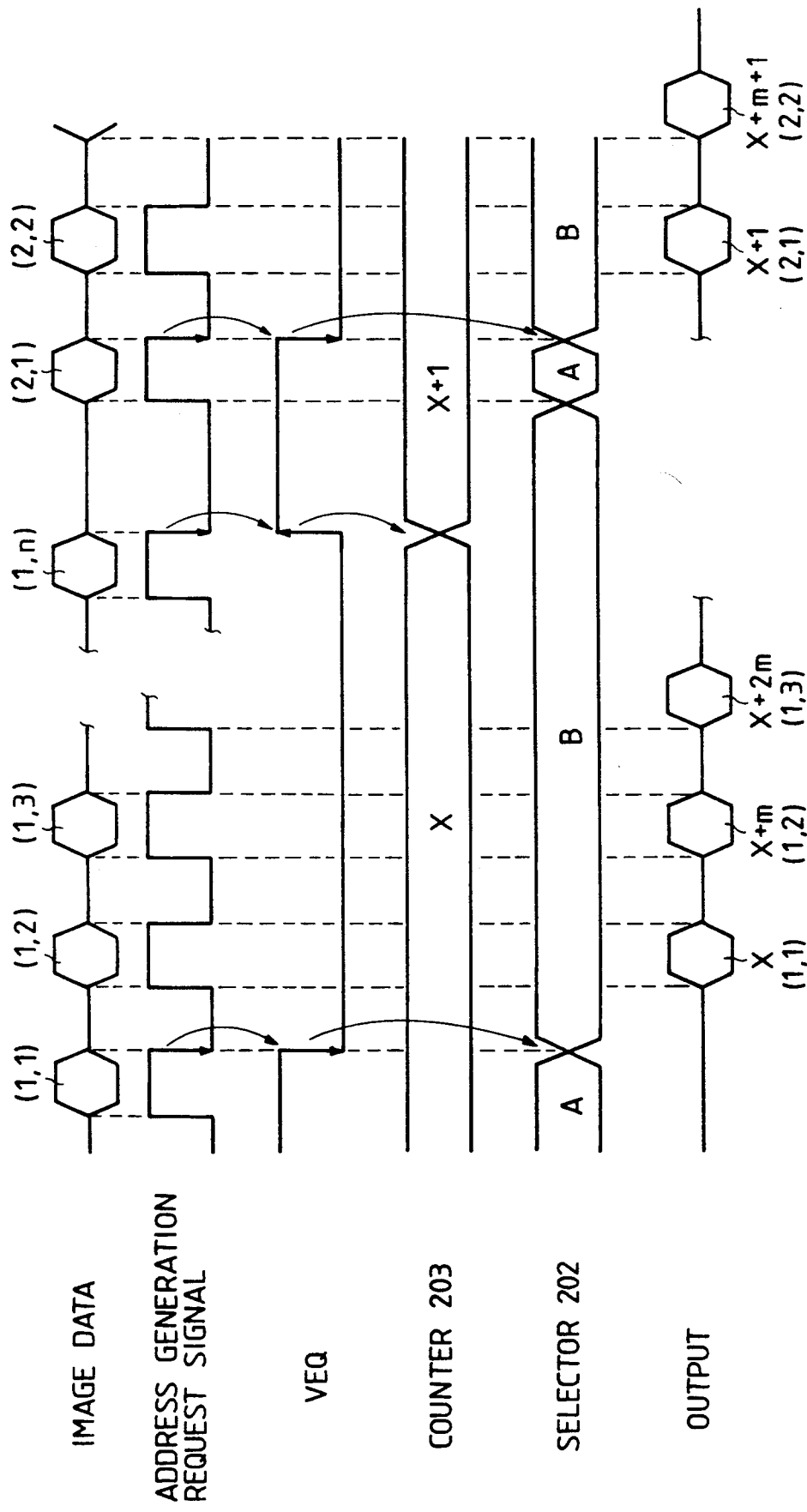
FIG. 4 is a timing chart for explaining the address designating operation.

The CPU 110 previously calculates the size of image 301 which is read by the scanning apparatus and sets the head address x of the space area in the necessary image memory into the register 201. At this time, the same value x is also loaded into the counter 203. Subsequently, the CPU 110 sets the number m of pixels in the H direction of the image 301 into the register 205. In the case of storing the image data into the memory 108 as an image itself (without executing a mirror image copying operation or the like), the counter 203 is counted up and the add/sub unit 204 is set into the adding mode. After completion of the initialization, the CPU 110 starts the scanning apparatus. The scanning apparatus starts reading from the area $A_1$ of the image 301. Due to this, the address generation request signals are successively generated from the control unit 206. The coordinates of the image which was read are sequentially written into the memory 108 in accordance with the order of (1, 1), (1, 2), (1, 3), ..., (1, n), (2, 1), ..., (2, n), ..., (m, 1), ..., (m, n). The address signals are generated as shown in a timing chart of FIG. 4. The image data is written to the memory locations whose addresses were designated synchronously with the address generation request signals which are output every pixel.

First, the data of (1, 1) is written into the initial address x set in the counter 203. That is, the value of (n−1) which is stored into a register 206c is set as an initial value into a counter 206b in the control unit 206. An output signal VEQ of a comparator 206d is set to the high level. Since the counter 203 executes the counting operation in response to a leading edge of the VEQ signal, the counting operation is not performed at this time. On the other hand, the selector 202 selects either one of inputs A and B on the basis of the AND of, for example, VEQ and the address generation request signal. When the AND is at the high level, the A input is selected. The value at this time is latched into the latch circuit 207 and is output with a delay time corresponding to one period of the address generation request signal. Therefore, the image data is delayed by a time of one period by a delay circuit or the like (not shown) and is written into the memory 108.

Then, the data of the coordinates (1, 2) is written into address (x+m) in the memory 108. The counter 203 does not execute the counting operation. The add/sub unit 204 adds x and the value m of the register 205 and outputs an address. At this time, the selector 202 selects the B input and (x+m) is latched into the latch circuit 207. After that, the addresses in the image memory are generated until the coordinates (1, n) by the similar control.

Subsequently, the data of (2, 1) is written into address (x+1). The control unit 206 counts up the count value of the counter 203 by one. The selector 202 selects the A input. Therefore, the address output is (x+1).

Figure 3B:
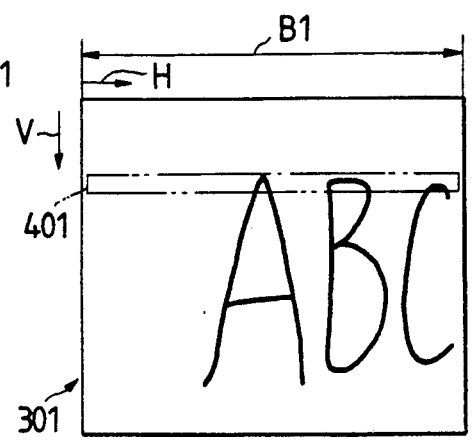
Figure 3C:
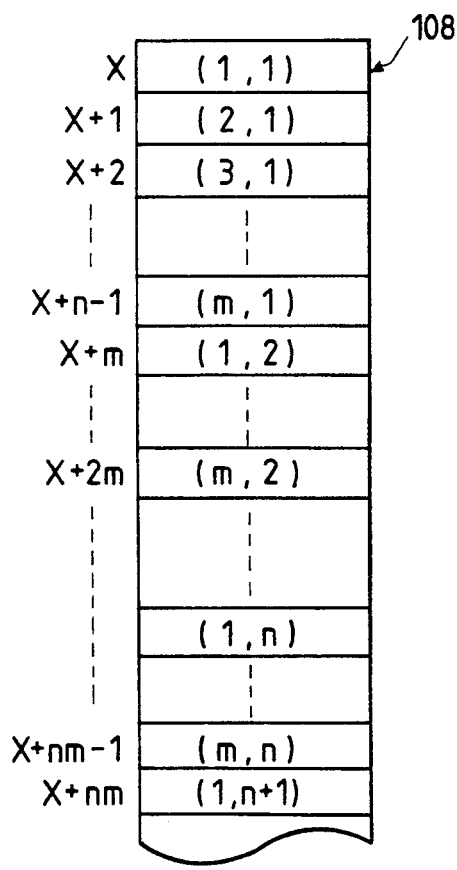
FIG. 3C is a diagram showing a storage state of image data in a memory 108.

By executing the above operations for a period of time of the scanning operation of the area $A_1$ of the image 301, the image data is written into the relevant addresses while producing the addresses (FIG. 3C).

After the area $A_1$ was scanned, the CPU 110 writes (x+mn) into the register 201 and starts the scan of the area $A_2$. By repeating the above operations until the area $A_4$, the data of the image 301 of one surface is written into the memory 108. The image data which was written is arranged in a manner such that the images of the scanning apparatus were raster-scan arranged in accordance with the incremental order of the addresses in the image memory. When the image data is transferred to the host computer 118, by merely incrementing the address one (+1) by one, the image data can be output as the raster scan data to the host computer 118.

Figure 5:
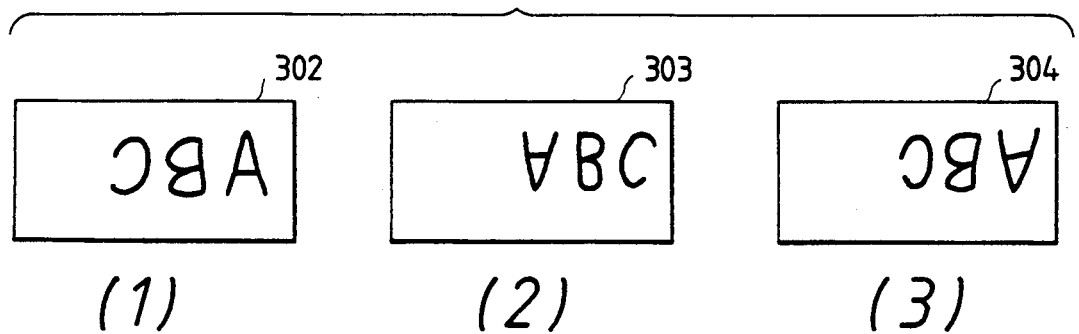
FIG. 5 is a diagram showing an image which is obtained by executing a process such as an inversion or the like to an original image.

The case of copying an inverted image or the like in the embodiment will now be described. As shown in FIG. 5(1), in the case where an original image is inverted with respect to the right/left directions and copied, (x+m−1) is given as an initial value to the register 201 (in the case of the area $A_1$), the counter 201 is made operative as a decrement counter, and it is sufficient to execute the other operations in a manner similar to the above.

On the other hand, in the case where an original image is inverted with respect to the vertical direction and copied as shown in FIG. 5(2), (x+4 nm−n+1) is given as an initial value to the register 201 (in the case of k=4 and the area $A_1$) and the add/sub unit 204 is made operative as a subtracter and it is sufficient to execute the other operations in a manner similar to the above.

Further, as shown in FIG. 5(3), in the case where an original image is rotated by an angle of 180° and copied, (x+4 nm) is given as an initial value to the register 201 (in the case of k=4 and the area $A_1$) and the counter 201 is made operative as a decrement counter and the add/sub unit 204 is made operative as a subtracter.

Although the case of inverting an image by the addressing in the writing operation into the memory 108 has been described as a method of copying the inverted image as shown in FIG. 5, the foregoing addressing can be also executed when the image data is read out of the memory 108.

According to the embodiment, the scanning apparatus is not limited to the internal image scanner 101 but can cope with the image data from an external scanning apparatus. That is, by changing the value which is set into the register 206c in accordance with the number n of pixels in the V direction which is determined by the number of constructing pixels of a line sensor or the like of the external scanning apparatus, it is possible to cope with a line sensor which reads on a pixel unit basis and other line sensors which read on a unit basis of arbitrary number of pixels. Therefore, the address control unit 107 can be assembled into a copying apparatus of other reading method without changing any hardware. The image data from other image reading apparatus can be also stored into the memory 108 in the foregoing copying apparatus 130 via an interface or the like.

FIG. 3B is a diagram for explaining the reading operation by the image scanner 401 having a width $B_1$. According to the image reading apparatus, the image 301 is read by scanning the image scanner 401 once in the V direction. Therefore, the image reading apparatus outputs the image data in accordance with the raster sequential order. In the case where the image data was input via the I/F unit 117, it is sufficient to write the image data while sequentially incrementing the addresses one (+1) by one.

Figure 6:
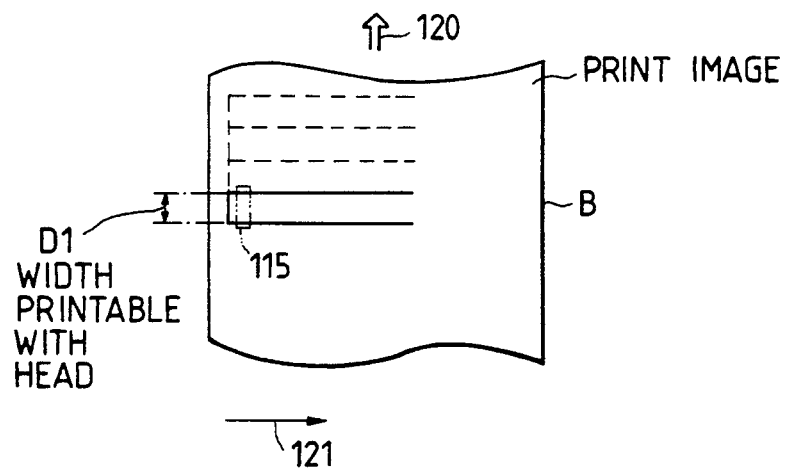
FIG. 6 is a diagram for explaining the serial printing operation.

The printing operation of the print head 115 will now be described. In the embodiment, as shown in FIG. 6, image data is printed onto a recording paper B by a shuttle method (serial print), for instance, by an ink jet method or the like. A width $D_1$ shown by arrows denotes a width at which the print head 115 can print. By moving the print head from the left to the right (in the direction of an arrow 121), one block can be printed in substantially the same manner as the case of the reading by the image scanner 101. Then, by moving the print paper in the direction of an arrow 120 by only a distance of the print width and by sequentially repeating the above operations, the image of one picture frame can be printed.

The addressing when the image data is read out of the memory 108 to the print head 115 is substantially the same as that in the case of writing the image data upon image reading shown in FIG. 3A.

With respect to the printing apparatus as well, in a manner similar to the scanning apparatus, the invention is not limited to the printer including the print head 115 which is assembled in the copying apparatus 130. By changing the value which is set into the register 206 in accordance with the number n of dots of one raster, the invention can cope with a print head of an arbitrary number of constructing pixels. On the other hand, the invention can also cope with a raster printer of the electrophotographic type. That is, in this case, it is sufficient to execute the reading operation while sequentially incrementing the address one (+1) by one when the image data is read out of the memory 108. Moreover, since the image data which was read out by various scanning apparatuses is integratedly stored into the memory 108 as surface data of the raster scan data format, in the case of executing the image processes in the copying apparatus 130, the processing efficiency is improved and the image processes can be executed by the host computer 118.

Embodiment 2

Since the embodiment 1 can execute the conversion between the shuttle scan data and the raster scan data, the copy operation can be performed even if apparatuses of different reading and printing methods are used. However, data (data which is stored into the registers 201, 205, and 206c and the like) which is necessary in the above case must be previously stored into an ROM in the CPU 110 or the user must input or select by operating the operation unit 116.

In the embodiment 2 shown in FIG. 7, apparatuses of different reading or printing methods are connected and the copy operation can be executed without needing any operation by the user. The copying apparatus of the second embodiment has substantially the same construction (FIGS. 1 and 2) as that of the first embodiment. Therefore, only the characteristic operations of the second embodiment will be described hereinbelow with reference to a flowchart of FIG. 7.

First, prior to executing the copy operation, the CPU 110 checks to see if the destination to which the image data is input has been set to the internal apparatus (image sensor 101) or the external apparatus (image reading apparatus which is connected through the I/F unit 117) (step S1). In the case of the internal input, the values to be set into the registers 201, 205, 206c, and the like are set to default values. Then, the processing routine advances to step S6, which will be explained hereinlater.

On the other hand, if the input destination of the image data has been set into the external apparatus in step S1, a transmission request of the data which is necessary to calculate the values to be set into the registers 201, 205, 206c, and the like is output via the I/F unit 117 (step S3). In response to the transmission request, the image reading apparatus connected to the I/F unit 117 transmits the necessary data. When the CPU 110 receives the necessary data (step S4), the CPU calculates the values to be set into the registers 201, 205, 206c, and the like on the basis of the necessary data and sets them.

Then, in steps S6 to S10, with respect to the output destination of the image data, substantially the same operations as those mentioned above are executed. After completion of the above operations, the copy operation is performed in step S11.

As mentioned above, in the embodiment 2, prior to the copy operation, the addressing method is preset in accordance with the apparatus which is connected to the outside, so that the operating efficiency of the copying apparatus is remarkably improved.

In the above embodiment 2, the kind of apparatus connected and the like have been recognized by the communication before the copy operation. However, the kind of external apparatus can be also discriminated from a state of each of the signal lines connected to the external apparatuses.

According to the above embodiments 1 and 2, the image data from the image reading apparatus which outputs the shuttle scan data is also converted into the raster scan data and written into the memory 108. Therefore, even in the case where a raster scan type soft display such as a CRT display or the like was used as an output apparatus, it can be used without executing a process such as rearrangement of image data or the like. Accordingly, processes can be also efficiently executed even in the case where the invention is applied to an image editing printing system such that, for instance, a CRT display or the like is connected in parallel as an output apparatus other than the printing apparatus and an editing operation is performed on the display and the final edited image is printed out.

The present invention is not limited to the foregoing embodiments but many modifications and variations are possible within the spirit and scope of the appended claims of the invention.

What is claimed is:

1. A memory addressing method by which it is possible to write in memory or read out from memory a plurality of kinds of image data, each kind of image data corresponding to a different scanning method, wherein
a parameter can be preset in correspondence to the kind of the image data,
an address value is calculated for every pixel datum, based on the set parameter, and
each of the pixel data is written or read out by using the calculated address value.

2. A method according to claim 1, wherein, by setting the parameter corresponding to the kind of the image data, the image data can be written so that arrangements of the pixel data in a memory are common irrespective of the kind of the image data, and
the pixel data of the common arrangement in the memory can be read out as image data corresponding to a preferred scanning method by setting the parameter.

3. A method according to claim 1, wherein one of said plurality of kinds of image data is raster scan image data.

4. A memory addressing method by which it is possible to write in memory or read out from memory a plurality of kinds of image data, each kind of image data corresponding to a different scanning method, wherein
a parameter can be preset in correspondence to the kind of the image data,
an address value is calculated for every pixel datum, based on the set parameter,
each of the pixel data is written or read out by using the calculated address value, and
one of the plurality of kinds of image data is image data corresponding to a shuttle scanning method.

5. An image data processing apparatus, comprising:
means for inputting and/or outputting a plurality of kinds of image data, each kind of image data corresponding to a different scanning method;
a memory which can store the image data;
setting means which can preset a parameter in correspondence to the kind of the image data; and
address signal output means for calculating an address value in the memory for every pixel datum of the image data, based on the parameter set by the setting means and for outputting the address value as an address signal for use in writing and/or reading out the pixel data.

6. An apparatus according to claim 5, wherein the address signal generating means sets the parameter corresponding to the kind of the image data to generate the address signal in such manner that arrangements of the pixel data in the memory are common irrespective of the kind of the image data.

7. An apparatus according to claim 5, wherein the input/output means inputs or outputs the image data corresponding to a raster scanning method as one of the plurality of kinds of image data.

8. An image data processing apparatus, comprising:
means for inputting and/or outputting a plurality of kinds of image data, each kind of the image data corresponding to a different scanning method;
a memory which can store the image data;
setting means which can preset a parameter in correspondence to the kind of the image data; and
address signal output means for calculating an address value in the memory for every pixel datum of the image data based on the parameter set by the setting means and for outputting the address value as an address signal for use in writing and/or reading out the pixel data,
wherein the input/output means inputs or outputs the image data corresponding to a shuttle scanning method as one of the plurality of kinds of image data.

9. An apparatus according to claim 6, further comprising means for detecting the lind of the image data which is input by the input/output means, wherein the setting means sets the parameter corresponding to the kind of the image data detected by the detecting means.

10. An image data processing apparatus comprising:
input means for inputting image data from one of a plurality of kinds of apparatuses, each of the plurality of kinds of the apparatus outputting image data corresponding to a respective different scanning method;
a memory into which the image data input by the input means is written; and
address signal generating means for generating an address signal to write pixel data of the image data into the memory,
wherein the address signal generating means can change an addressing mode in accordance with the kind of the apparatus which output the image data.

11. An apparatus according to claim 10, wherein the image data processing apparatus has an image reading apparatus as one of the plurality of kinds of apparatuses.

12. An image data processing apparatus comprising:
output means for outputting image data to one of a plurality of kinds of apparatuses, each kind of apparatus outputting the image data corresponding to a respective different scanning method;
a memory for storing the image data to be output from the output means; and
address signal generating means for generating an address signal to read out pixel data of the image data stored in the memory,
wherein the address signal generating means can change an addressing mode in accordance with the kind of the apparatus which is to input the image data.

13. An apparatus according to claim 12, wherein the image data processing apparatus has an image recording apparatus as one of the plurality of kinds of apparatuses.

14. A digital copying apparatus comprising:
an image reading apparatus for reading an image and outputting image data corresponding to a predetermined scanning method;
a memory for storing the image data output from the image reading apparatus;
an address signal generating circuit for generating an address signal for use in executing a writing or reading operation for the memory;
a controller for determining one of a plurality of addressing modes in the address signal generating circuit, each addressing mode corresponding to a different scanning method; and an image recording apparatus for recording the image data which was output from the memory.

15. An apparatus according to claim 14, further comprising an interface for inputting the image data from outside the digital copying apparatus into the memory and for outputting the image data out of the digital copying apparatus from the memory.

16. An apparatus according to claim 15, further comprising a detector for detecting the kind of the image data which is input from outside the digital copying apparatus, wherein the controller determines the addressing mode, based on the result of the detection performed by the detector.

17. An image data processing apparatus according to claim 10, wherein said address signal generating means sets the addressing mode in accordance with the kind of the apparatus, so that arrangements of the pixel data in the memory are common irrespective of the kind of the apparatus.

18. An image data processing apparatus according to claim 10, wherein said address signal generating means comprises a register for setting a parameter corresponding to the addressing mode, and generates the address signal based on the parameter set in the register.

19. An image data processing apparatus according to claim 10, wherein the plurality of kinds of the apparatus comprises at least one of a raster scanning apparatus and a shuttle scanning apparatus.

20. An image processing apparatus according to claim 10, further comprising means for detecting the kind of the apparatus.

21. An image processing apparatus according to claim 12, wherein said memory stores the pixel data, arrangements of which are common irrespective of the kind of the apparatus.

22. An image processing apparats according to claim 12, wherein said address signal generating means comprises a register for setting a parameter corresponding to the addressing mode, and generates the address signal based on the parameter set in the register.

23. An image processing apparatus according to claim 12, wherein the plurality of kinds of the apparatus comprises at least one of a raster scanning apparatus and a shuttle scanning apparatus.

24. An image processing apparatus according to claim 12, further comprising means for detecting the kind of the apparatus.

25. A digital copying apparatus according to claim 14, wherein said address signal generating means comprises a register for setting a parameter corresponding to the addressing mode, and generates the address signal based on the parameter set in the register.

* * * * *

UNITED STATES PATENT AND TRADEMARK OFFICE
CERTIFICATE OF CORRECTION

PATENT NO. : 5,303,068
DATED : April 12, 1994
INVENTOR(S) : YUTAKA UDAGAWA ET AL.

It is certified that error appears in the above-indentified patent and that said Letters Patent is hereby corrected as shown below:

<u>COLUMN 3</u>

Line 51, "accordance" should read --accordance with--.

<u>COLUMN 10</u>

Line 18, "lind" should read --kind--.

<u>COLUMN 12</u>

Line 10, "apparats" should read --apparatus--.
    Line 27, insert claim 26,
        --26. A digital copying apparatus according to claim 14, wherein said memory stores the image data in a common arrangement irrespective of the scanning method.--.

Signed and Sealed this

Seventeenth Day of January, 1995

Attest:

BRUCE LEHMAN

*Attesting Officer*    *Commissioner of Patents and Trademarks*